United States Patent
Yong et al.

(10) Patent No.: US 7,571,648 B2
(45) Date of Patent: Aug. 11, 2009

(54) PIEZOELECTRIC VIBRATION ANGULAR VELOCITY SENSOR

(75) Inventors: Yook-Kong Yong, Princeton, NJ (US); Mihir S Patel, New Brunswick, NJ (US); Shigeo Kanna, Nagano-ken (JP); Masako Tanaka, Okaya (JP)

(73) Assignees: Seiko Epson Corporation, Tokyo (JP); Rutgers, The State University of New Jersey, New Brunswick, NJ (US)

( * ) Notice: Subject to any disclaimer, the term of this patent is extended or adjusted under 35 U.S.C. 154(b) by 29 days.

(21) Appl. No.: 11/752,674

(22) Filed: May 23, 2007

(65) Prior Publication Data
US 2008/0289418 A1 Nov. 27, 2008

(51) Int. Cl.
*G01P 9/04* (2006.01)
(52) U.S. Cl. ................. 73/504.12; 73/504.04
(58) Field of Classification Search ............. 73/504.12, 73/504.04, 504.15, 504.16, 504.02; 310/316.01
See application file for complete search history.

(56) References Cited

U.S. PATENT DOCUMENTS

| | | | | |
|---|---|---|---|---|
| 5,396,144 A | | 3/1995 | Gupta et al. | |
| 5,794,080 A | * | 8/1998 | Watanabe et al. | 396/53 |
| 6,111,338 A | * | 8/2000 | Otsuchi et al. | 310/352 |
| 6,209,393 B1 | * | 4/2001 | Tomikawa et al. | 73/504.12 |
| 6,250,158 B1 | * | 6/2001 | Stewart | 73/504.14 |
| 6,477,897 B1 | * | 11/2002 | Mori | 73/504.12 |

OTHER PUBLICATIONS

K. Nakamura et al., "Vibratory Gyroscopes Using Trapped-Energy Vibrators of Rotated *Y*-cut $LiTaO_3$", IEEE Ultrasonics Symposium, 2001, pp. 611-614.

* cited by examiner

*Primary Examiner*—Helen C. Kwok
(74) *Attorney, Agent, or Firm*—Oliff & Berridge, PLC

(57) ABSTRACT

An angular velocity sensor includes a protrusion protruding in a Y'-axis direction and extending in an X-axis direction on a main surface of a rotated Y cut quartz plate, and an excitation electrode and a detection electrode formed on the main surface adjacent to this protrusion. This excitation electrode excites thickness-shear vibration in the X-axis direction on the quartz substrate, exiting vibration on the protrusion. Then, the protrusion is bent and displaced due to Coriolis force acting in a direction orthogonal to the vibration of the protrusion corresponding to a rotation around an Y' axis. This displacement at the protrusion is applied to the quartz substrate as stress. The detection electrode detects change of this stress, thereby angular speed added to the angular velocity sensor is detected.

12 Claims, 12 Drawing Sheets

PIEZOELECTRIC VIBRATION ANGULAR VELOCITY SENSOR

BACKGROUND OF THE INVENTION

1. Field of the Invention

The present invention relates to an angular velocity sensor using piezoelectric vibration, in particular, an angular velocity sensor using a quartz substrate.

2. Description of the Related Art

Angular velocity sensors are used for camera shake detection in photographic devices, direction detection in car navigation systems, and so on. In recent years, such a demand prevails in various fields, and sensors are required to have improvement in performance and be downsized.

As an angular velocity sensor using a piezoelectric substrate, an angular velocity sensor with a piezoelectric vibration system using two vibration modes of an excitation mode and a detection mode orthogonalized has been known. For example, U.S. Pat. No. 5,396,144 discloses an angular velocity sensor using a tuning-fork crystal resonator performing flexural vibration in the specification. Such an angular velocity sensor using flexural vibration tends to easily have degradation of characteristics due to a support of a resonator. The related art has a structure provided with a suspension system on a support portion so as to avoid influence on the support portion from the outside world.

Further, *Vibratory Gyroscope Using Trapped-Energy Vibrators of Y-cut LiTaO3* (Nakamura et al.), IEEE ULTRASONICS SYMPOSIUM, pp. 611-614, 2001 discloses an angular velocity sensor utilizing a thickness-shear resonator with a $LiTaO_3$ substrate. Thickness-shear vibration is an energy trapping type. Therefore, by using this vibration, a supporting structure of a resonator is facilitated since a support of the resonator does not affect on the vibration.

Such an angular velocity sensor using flexural vibration while not receiving impact from a support portion on resonator characteristics causes a problem in which a structure of the support portion becomes complicated. Further, a conventional angular velocity sensor using thickness-shear vibration has a simple supporting structure of a resonator. However, since a $LiTaO_3$ substrate is used, stable frequency-temperature characteristics are not obtained. Therefore, the conventional angular velocity sensor has a problem in which highly accurate detection of angular velocity cannot stably provide in a wide range of temperature.

SUMMARY OF THE INVENTION

This invention is to solve at least one of the problems above and can be achieved by structures below.

An angular velocity sensor includes a quartz substrate in a flat plate shape being cut out from quartz single crystal rotated by a range of zero to one hundred eighty degrees around an X axis from a crystal coordinate system (X, Y, Z) to a coordinate system (X, Y', Z') so that a main surface is parallel with respect to the X-axis and a Z'-axis of the coordinate system (X, Y', Z'); a protrusion monolithically formed with the quartz substrate on a main surface so as to protrude in a Y'-axis direction and extend in an X-axis direction; an excitation electrode and a detection electrode formed adjacent to the protrusion on the main surface. The angular velocity sensor is characterized in that vibration is excited at the protrusion by exciting thickness-shear vibration in the X-axis direction on a portion having the excitation electrode and the detection electrode formed on the quartz substrate by an electric filed applied to the excitation electrode, and the protrusion is bent by Coriolis force acting corresponding to a rotation around a Y'-axis and displacement thereof is transmitted to the quartz substrate, so that the detection electrode detects change of stress applied to the quartz substrate.

As above, according to the angular velocity sensor of this invention, thickness-shear vibration that is an energy trapping type is used in the excitation mode, facilitating a supporting structure of a resonator. Further, since a quartz substrate is used, favorable frequency-temperature characteristics are obtained, stably enabling highly accurate detection of angular velocity.

Furthermore, the angular velocity sensor of this invention, the quartz substrate is desirably an AT-cut quartz substrate.

As above, according to the angular velocity sensor of this invention, since an AT-cut quartz substrate is used, it has superior frequency-temperature characteristics, stably enabling highly accurate detection of angular velocity in a wide range of temperature.

Further, the angular velocity sensor of this invention desirably includes a protrusion formed between the excitation electrode and the detection electrode in a plain view of the main surface.

As above, according to the angular velocity sensor of this invention, thickness-shear vibration is excited on a portion on which the excitation electrode and the detection electrode are formed on the quartz substrate by applying an electric field to the excitation electrode. In addition, since the protrusion is formed between the excitation electrode and the detection electrode, vibration can be excited on this protrusion by receiving an influence of the thickness-shear vibration of the quartz substrate.

Further, the angular velocity sensor of this invention, the protrusion is desirably formed in a plurality of numbers in the X-axis direction.

As above, according to the angular velocity sensor of this invention, by forming the plurality of protrusions in the X-axis direction, displacement of the protrusions is increased in a case where the rotation around the Y' axis is added to the angular velocity sensor. As a result, stress added to the quartz substrate increases, improving detection sensitivity of angular velocity.

Further, the angular velocity sensor of this invention, each of the plurality of protrusions is preferably different in size.

As above, according to the angular velocity sensor of this invention, forming the protrusions in different sizes enables it to pick up fluctuations of angular velocity.

Furthermore, the angular velocity sensor of this invention, the protrusion is desirably formed in a plurality of numbers in a Z'-axis direction.

As above, according to the angular velocity sensor of this invention, by forming the plurality of protrusions in the Z'-axis direction, displacement of the protrusions is increased in a case where the rotation around the Y' axis is added to the angular velocity sensor. As a result, stress added to the quartz substrate increases, improving detection sensitivity of angular velocity.

An angular velocity sensor includes a quartz substrate in a flat plate shape being cut out from quartz single crystal rotated by a range of zero to one hundred eighty degrees around an X axis from a crystal coordinate system (X, Y, Z) to a coordinate system (X, Y', Z') so that main surfaces are parallel with respect to the X-axis and a Z'-axis of the coordinate system (X, Y', Z'); protrusions monolithically formed with the quartz substrate on both of the main surfaces so as to protrude in a Y'-axis direction and extend in an X-axis direction; an excitation electrode and a detection electrode formed adjacent to the protrusions on the main surfaces. The angular velocity sensor is characterized in that vibration is excited at the protrusions by exciting thickness-shear vibration in the X-axis direction on a portion having the excitation electrode and the detection electrode formed on the quartz substrate by an electric filed applied to the excitation electrode, and the protrusions are bent by Coriolis force acting corresponding to a rotation around a Y'-axis and displacement thereof is transmitted to the quartz substrate, so that the detection electrode detects change of stress applied to the quartz substrate.

As above, according to the angular velocity sensor of this invention, thickness-shear vibration that is an energy trapping type is used in the excitation mode, facilitating a supporting structure of a resonator. In addition, since a quartz substrate is used, favorable frequency-temperature characteristics are obtained, stably enabling highly accurate detection of angular velocity.

Further, the angular velocity sensor of this invention, the quartz substrate is preferably an AT-cut quartz substrate.

As above, according to the angular velocity sensor of this invention, since an AT-cut quartz substrate is used, it has superior frequency-temperature characteristics, stably enabling highly accurate detection of angular velocity in a wide range of temperature.

Further, the angular velocity sensor of this invention desirably includes the protrusions formed between the excitation electrode and the detection electrode in a plain view of the main surface.

As above, according to the angular velocity sensor of this invention, thickness-shear vibration is excited on the quartz substrate on which the excitation electrode and the detection electrode are formed by applying an electric field to the excitation electrode. In addition, since the protrusions are formed between the excitation electrode and the detection electrode, vibration can be excited on these protrusions by having an influence of the thickness-shear vibration of the quartz substrate.

Further, the angular velocity sensor of this invention, the protrusions are preferably formed in a plurality of numbers in an X-axis direction.

As above, according to the angular velocity sensor of this invention, by forming the plurality of protrusions in the X-axis direction, displacement of the protrusions is increased in a case where the rotation around the Y' axis is added to the angular velocity sensor. As a result, stress added to the quartz substrate increases, improving detection sensitivity of angular velocity.

Further, the angular velocity sensor of this invention, each of the plurality of protrusions is preferably different in size.

As above, according to the angular velocity sensor of this invention, forming the protrusions in different sizes enables it to pick up fluctuations of angular velocity.

Furthermore, the angular velocity sensor of this invention, the protrusions are desirably formed in a plurality of numbers in a Z'-axis direction.

As above, according to the angular velocity sensor of this invention, by forming the plurality of protrusions in the Z'-axis direction, displacement of the protrusions is increased in a case where a rotation around the Y' axis is added to the angular velocity sensor. As a result, stress added to the quartz substrate increases, improving detection sensitivity of angular velocity.

BRIEF DESCRIPTION OF THE DRAWINGS

FIG. 2 shows a structure of the angular velocity sensor according to the first embodiment. FIG. 2(a) is a plain view, while

FIG. 14 shows a structure of the angular velocity sensor according to the second embodiment. FIG. 14(a) is a plain view, while

DETAIL DESCRIPTION OF PREFERRED EMBODIMENT

Hereinafter, embodiments of the invention will be described with reference to the accompanying drawings.

First Embodiment

Figure 1:
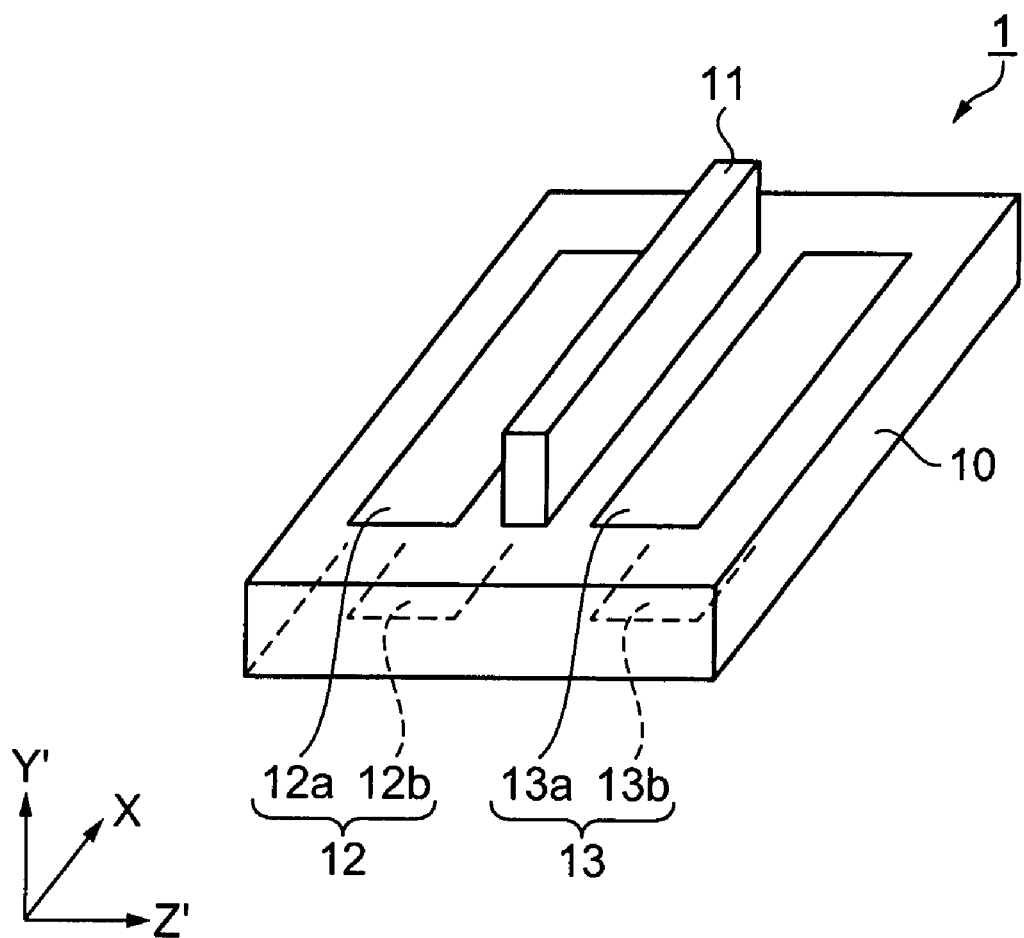
FIG. 1 is a perspective view schematically showing an angular velocity sensor according to a first embodiment.
Figure 2A:
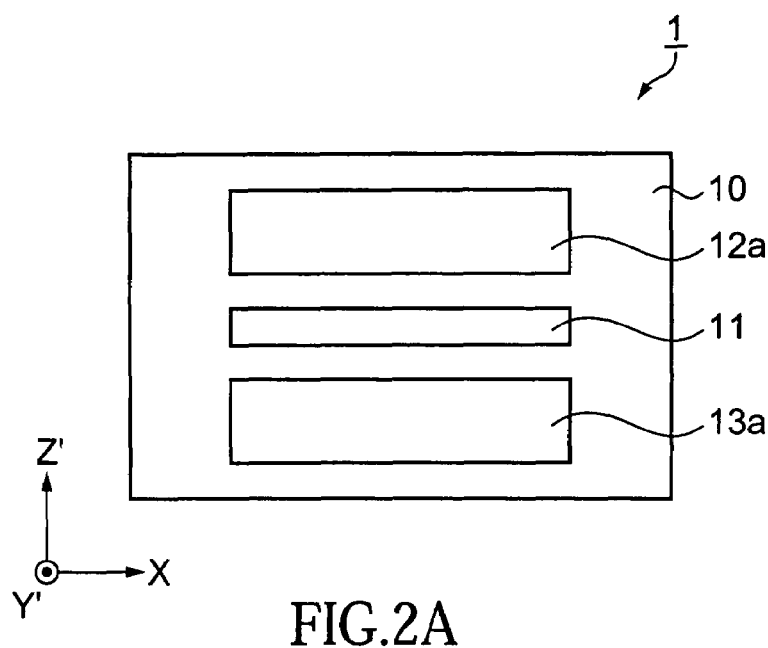
Figure 2B:
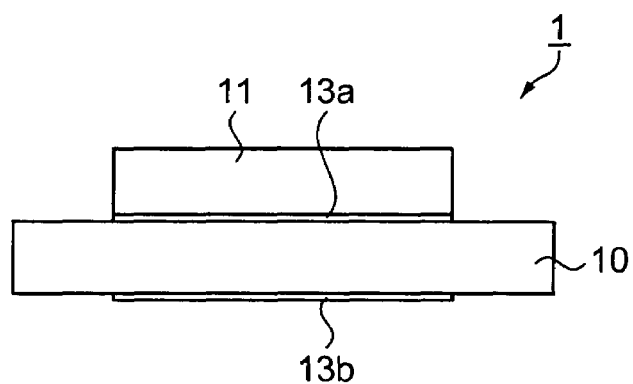
FIG. 2(b) is a side view and FIG. 2(c) is a bottom view.
Figure 2C:
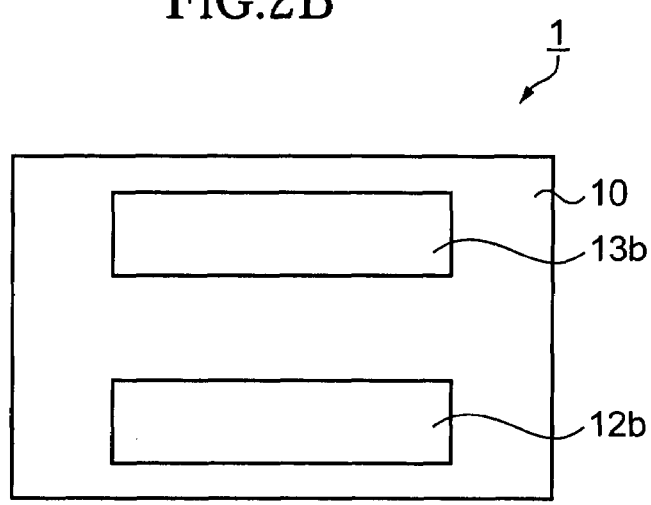

FIG. 1 is a perspective view schematically showing an angular velocity sensor according to this embodiment. FIG. 2 shows a structure of the angular velocity sensor according to the embodiment. FIG. 2(a) is a plain view, while FIG. 2(b) is a side view, and FIG. 2(c) is a bottom view. Further, FIG. 3 is a schematic view explaining a cutting plane of a quartz substrate.

In FIG. 1, an angular velocity sensor 1 includes a quartz substrate 10 in a flat plate shape having parallel main surfaces, a protrusion 11 monolithically formed with the quartz substrate 10 on one of the main surfaces thereof, an excitation electrode 12 and a detection electrode 13, each being formed as a pair opposed to each other on the main surfaces of the quartz substrate and on both sides of the protrusion 11.

Figure 3:
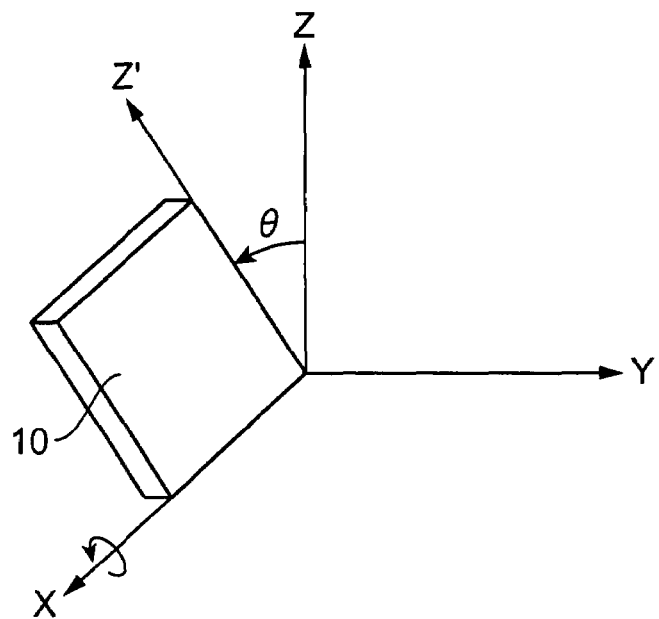
FIG. 3 is a schematic view explaining a cutting plane of a quartz substrate according to the first embodiment and a second embodiment.

As shown in FIG. 3, the quartz substrate 10 is cut out from quartz single crystal rotated by a range of θ=0 to 180 degrees around an X axis from a crystal coordinate system (X, Y, Z) to a coordinate system (X, Y', Z') so that two main surfaces are parallel with respect to the X-axis and a Z'-axis of the coordinate system (X, Y', Z'). The quartz substrate cut out as above also called as a quartz crystal rotated Y plate. It is known to perform thickness-shear vibration when an electric field is applied between the main surfaces. In this embodiment, the quartz substrate 10 is cut by the AT cut that is typified by θ=35° 15'. Here, being parallel to two main surfaces means to be in parallel so that thickness-shear vibration is performed when an electric field is applied between the main surfaces. As shown in FIGS. 1 and 2, the protrusion 11 is formed on one of the main surfaces of the quartz substrate 10 so as to protrude in a Y' axis direction and extend in an X-axis direction. The protrusion 11 can be monolithically formed with the quartz substrate by etching the quartz substrate.

Further, in a plain view of the main surface of the quartz substrate 10, the protrusion 11 is formed between an electrode 12a and an electrode 13a (refer to FIG. 2(a)). As above, on the one of the main surfaces of the quartz substrate 10, the electrode 12a and the electrode 13a are separated by the protrusion 11. The electrode 12a composes an excitation electrode 12 with an electrode 12b formed on the other of the opposed main surfaces of the quartz substrate 10. The excitation electrode 12 excites thickness-shear vibration of the quartz substrate 10 by applying an electric field between the electrode 12a and the electrode 12b. Further, the electrode 13a composes a detection electrode 13 with an electrode 13b formed on the other of the opposed main surfaces of the quartz substrate 10. The detection electrode 13 can detect an amount of charge caused by change in a stress condition of the quartz substrate 10.

The excitation electrode 12 and the detection electrode 13 include a Cr film as an underlayer, and a Au film formed thereon. Further, it is possible that a space between the electrode 12b and the electrode 13b formed on the other main surface of the quartz substrate 10 can be buried to form an electrode functioning as a common electrode.

Next, operations of excitation and detecting angular velocity of the angular velocity sensor 1 mentioned above will be explained.

Figure 4:
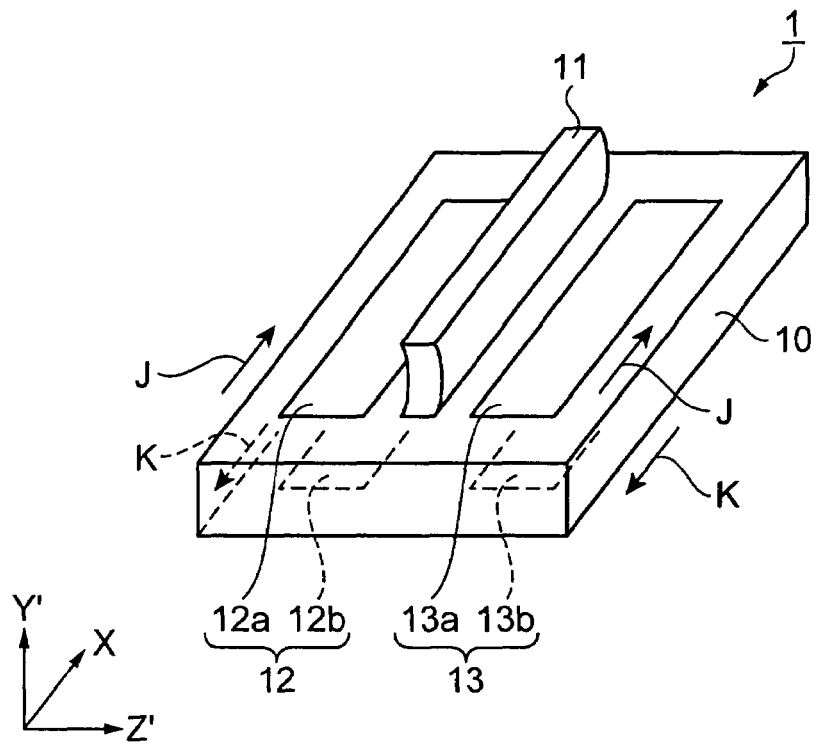
FIG. 4 is a schematic view explaining an excitation mode of the angular velocity sensor according to the first embodiment.
Figure 5:
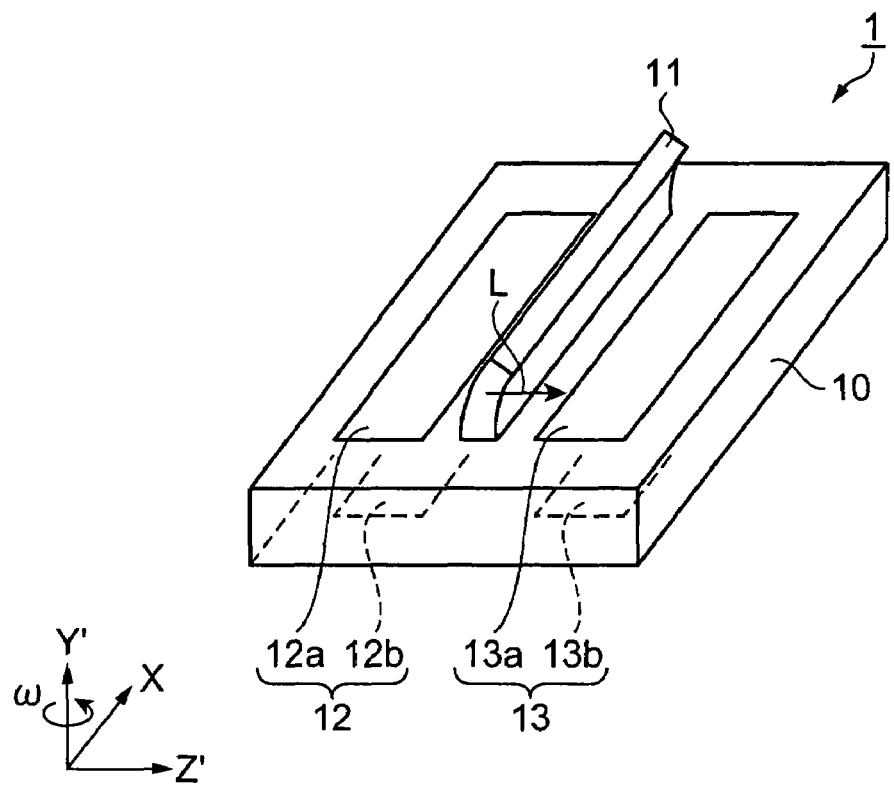
FIG. 5 is a schematic view explaining a detection mode of the angular velocity sensor according to the first embodiment.

FIG. 4 is a schematic view explaining an excitation mode of the angular velocity sensor according to this embodiment. FIG. 5 is a schematic view explaining a detection mode of the angular velocity sensor according to the embodiment.

In FIG. 4, when an electric field is applied to the quartz substrate 10 by the excitation electrode 12, thickness-shear vibration in the X-axis direction is generated at a portion sandwiched by the electrode 12a and the electrode 12b on the quartz substrate 10. The one of the main surfaces of the quartz substrate 10 moves in a direction of an arrow J and the other main surface moves in a direction of an arrow K. These movements and opposite movements thereof are performed alternatively and continuously, thereby generating the thickness-shear vibration. A portion on which the detection electrode 13 is formed on the quartz substrate 10 is elastically coupled to a portion on which the excitation electrode 12 is formed, thereby thickness-shear vibration is also generated at this portion of the quartz substrate 10. Further, the protrusion 11 also vibrates as it is pulled by the thickness-shear vibration of the quartz substrate 10. This vibration of the protrusion 11 is dominated by vibration in the X-axis direction. However, as the vibration is pulled toward to the excitation electrode 12 where strong thickness-shear vibration is generated, the vibration of the protrusion 11 also includes vibration in a Z' axis direction.

Next, when a rotation around a Y'-axis is added to the angular velocity sensor 1 in the excitation mode as above, as shown in FIG. 5, Coriolis force acts on the protrusion 11 of the angular velocity sensor 1, causing bending displacement of the protrusion 11 in a direction of an arrow L. The Coriolis force acts in an orthogonal direction with respect to the thickness-shear vibration of the protrusion 11 in the excitation mode. Therefore, the protrusion 11 performs flexural vibration alternatively in the direction of the arrow L and an opposed direction thereof corresponding to this thickness-shear vibration.

Then, the bending displacement of the protrusion 11 is transmitted to the quartz substrate 10, acting as to add stress on the portion on which the detection electrode 13 is formed on the quartz substrate 10 and generating an electric charge at this portion. Detecting this electric charge with the detection electrode 13 enables detection of angular velocity ω.

Figure 6:
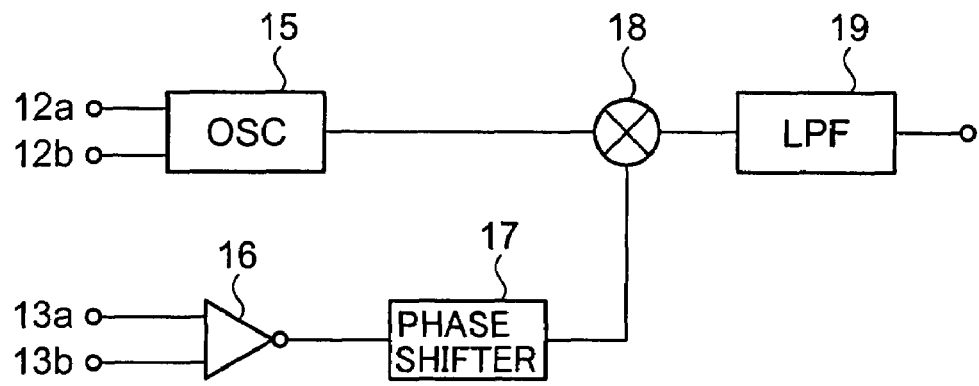
FIG. 6 is a circuit diagram explaining an example of structures of an excitation and detection circuit coupled with the angular velocity sensor.

For such detection by the angular velocity sensor, an example of an excitation and detection circuit is shown in FIG. 6. The electrodes 12a and 12b composing the excitation electrode are coupled to an oscillation circuit 15 so as to excite the quartz substrate. Further, the electrodes 13a and 13b composing the detection electrode are coupled to an amplifier 16. The amplifier 16 is coupled to a phase shifter 17 that is coupled to a multiplier 18. Similarly, the oscillation circuit 15 is coupled to the multiplier 18 that is coupled to a low pass filter 19.

A signal of a charge amount detected by the detection electrode is amplified by the amplifier 16 and shifted by a phase of π/4 by the phase shifter 17 so as to be input to the multiplier 18. Further, a frequency signal of the oscillation circuit 15 is input to the multiplier 18. The both signals are multiplied each other, being input to the low pass filter 19. Then, after noise is eliminated by the low pass filter 19, the signal is output. Accordingly, the amount of charge generated in the quartz substrate is detectable with the detection electrode.

Figure 7:
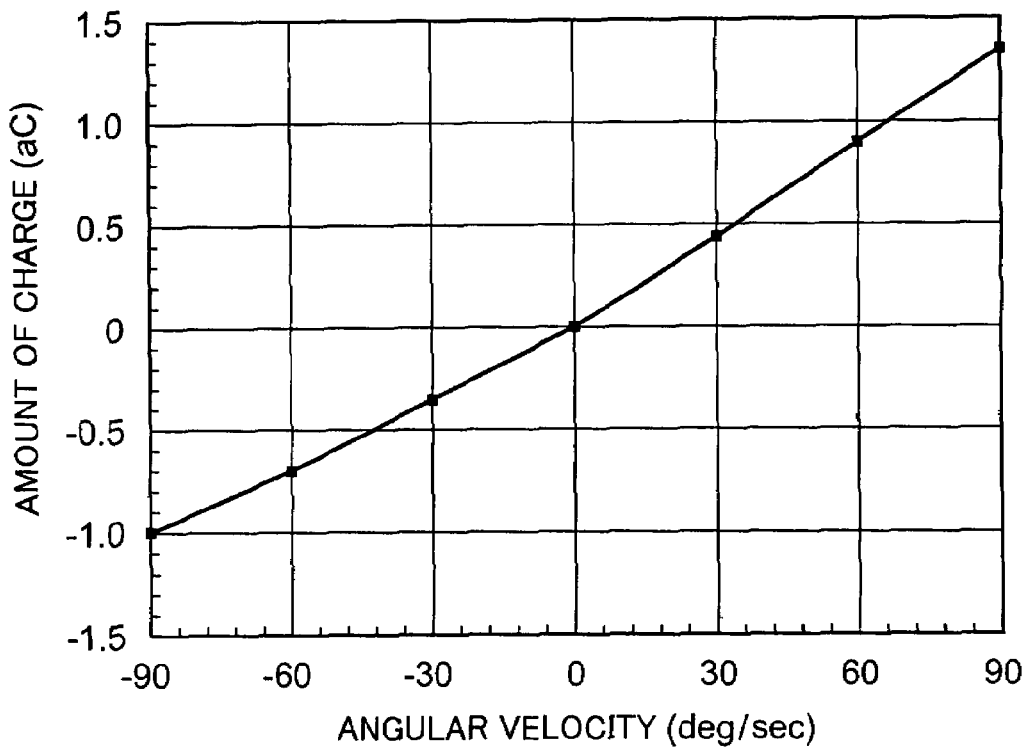
FIG. 7 is a graph showing a relation between a charge amount and angular velocity of angular velocity sensor according to the first embodiment.

FIG. 7 shows a relation between an amount of charge generated in the quartz substrate and angular velocity for the angular velocity sensor having a structure described above. This graph shows the amount of charge generated in the quartz substrate and the angular velocity are in a proportional relation, so that angular velocity is detectable from an amount of charge.

As above, the angular velocity sensor 1 according to this embodiment includes the protrusion 11 protruding in the Y'-axis direction and extended in the X axis direction on the one of the main surfaces of the quartz substrate 10 that is a quartz crystal rotated Y plate. Further, the protrusion 11 is formed between the excitation electrode 12 and the detection electrode 13 on the main surface of the quartz substrate 10.

In this angular velocity sensor 1, by applying an electric field to the excitation electrode 12, thickness-shear vibration is generated on the portion on which this excitation electrode 12 is formed, and also on the portion on which the detection electrode 13 is formed. At this time, vibration on the protrusion 11 is also excited as it is pulled by the thickness-shear vibration. When the rotation around the Y'-axis is added to the angular velocity sensor in this state, bending displacement of the protrusion 11 in the direction of the arrow L occurs due to Coriolis force. Then, the bending displacement of the protrusion 11 is transmitted to the quartz substrate 10, acting as to add stress on the portion on which the detection electrode 13 is formed on the quartz substrate 10 and generating an electric charge at this portion. Detecting this electric charge with the detection electrode 13 enables detection of angular velocity.

As above, according to the angular velocity sensor 1 of this embodiment, thickness-shear vibration that is an energy trapping type is used in the excitation mode, facilitating a supporting structure of a resonator. Further, since an AT-cut quartz substrate is used, it has superior frequency-temperature characteristics similar to an AT-cut crystal resonator, stably enabling highly accurate detection of angular velocity in a wide range of temperature.

Next, a modification of the first embodiment will be described.

[First Modification]

Figure 8:
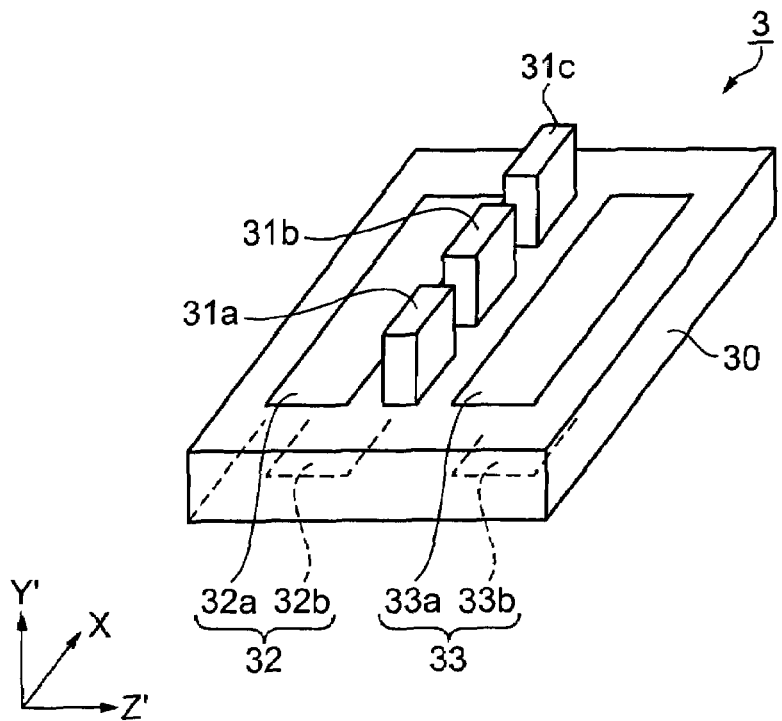
FIG. 8 is a perspective view showing a modification of the angular velocity sensor according to the first embodiment.

FIG. 8 is a perspective view showing a modification of the angular velocity sensor according to the first embodiment. In this first modification, a point in which a plurality of protrusions are formed is different from the first embodiment.

An angular velocity sensor 3 includes a quartz substrate 30 in a flat plate shape having parallel main surfaces, a plurality of protrusions 31a, 31b, and 31c monolithically formed with the quartz substrate 30 on one of the main surfaces, an excitation electrode 32 and a detection electrode 33, each being formed as a pair opposed to each other on the main surfaces. The quartz substrate 30 is cut by the AT cut.

The protrusions 31a, 31b, and 31c are formed in a line on the one of the main surfaces of the quartz substrate 30 so as to protrude in the Y'-axis direction and extend in the X-axis direction. These protrusions 31a, 31b, and 31c are formed between the excitation electrode 32 and the detection electrode 33 in a plain view of the main surface of the quartz substrate 30. The excitation electrode 32 is composed of electrodes 32a and 32b formed on the main surfaces so as to be opposed to each other. Similarly, the detection electrode 33 is composed of electrodes 33a and 33b formed on the main surfaces so as to be opposed to each other. As above, on the one of the main surfaces of the quartz substrate 30, the electrode 32a and the electrode 33a are separated by the protrusions 31a, 31b, and 31c.

As for height, length, and width of each protrusion of the protrusions 31a, 31b, and 31c, all of the size can be either same or different. Further, the number of protrusions is not limited to the number shown in the figure. Therefore, more protrusions can be formed.

In this angular velocity sensor 3, each of the protrusions functions as the same as the protrusion described in the first embodiment. Rotation angular velocity is applied while vibration is excited on the protrusions, causing bending displacement of the protrusions 31a, 31b, and 31c. The bending displacement is added to the quartz substrate 30 as stress, and then the detection electrode detects an amount of charge generated.

The angular velocity sensor 3 in the first modification can increase displacement of the protrusion in a case where a rotation is added to the angular velocity sensor 3 by forming a plurality of protrusions in addition to an effect of the first embodiment. As a result, stress added to the quartz substrate 30 increases, improving detection sensitivity of angular velocity.

[Second Modification]

Figure 9:
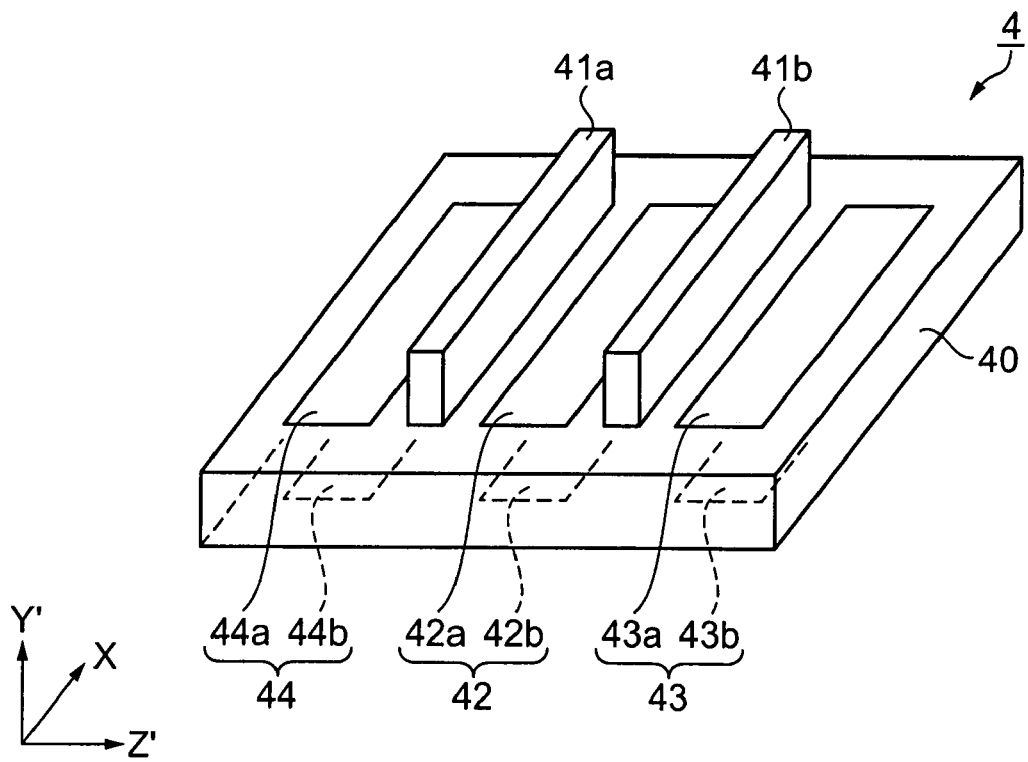
FIG. 9 is a perspective view showing another modification of the angular velocity sensor according to the first embodiment.

FIG. 9 is a perspective view showing another modification of the angular velocity sensor according to the first embodiment. In this modification, a point in which a plurality of protrusions are formed in the Z'-axis direction is different from the first embodiment.

An angular velocity sensor 4 includes a quartz substrate 40 in a flat plate shape having parallel main surfaces, a plurality of protrusions 41a and 41b monolithically formed with the quartz substrate 40 on one of the main surfaces, an excitation electrode 42 and detection electrodes 43 and 44 formed on the main surfaces. The quartz substrate 40 is cut by the AT cut.

The protrusions 41a and 41b are formed on the one of main surfaces of the quartz substrate 40 and aligned in the Z'-axis direction. Further, each of the protrusions 41a and 41b is formed so as to protrude in the Y'-axis direction and extend in the X-axis direction.

In a plain view of the main surface of the quartz substrate 40, the protrusion 41a is formed between the excitation electrode 42 and the detection electrode 44, while the protrusion 41b is formed between the excitation electrode 42 and the detection electrode 43.

The excitation electrode 42 is composed of electrodes 42a and 42b formed on the main surface so as to be opposed to each other.

Further, the detection electrode 43 is composed of electrodes 43a and 43b formed on the main surface so as to be opposed to each other, while the detection electrode 44 is composed of electrodes 44a and 44b. As above, on the one of the main surfaces of the quartz substrate 40, the electrode 42a and the electrode 44a are separated by the protrusion 41a, while the electrode 42a and the electrode 43a are separated by the protrusion 41b.

Operations of this angular velocity sensor 4 are as described below. When an electric field is applied to the excitation electrode 42, thickness-shear vibration in the X-axis direction is generated at this portion on the quartz substrate 40. Portions on which the detection electrode 43 and the detection electrode 44 are formed on the quartz substrate 40 are elastically coupled to the portion on which the excitation electrode 42 is formed, thereby thickness-shear vibration is generated at these portions of the quartz substrate 40.

Further, the protrusions 41a and 41b are also vibrated as they are pulled by this thickness-shear vibration of the quartz substrate 40. The vibration of these protrusions 41a and 41b is dominated by vibration in the X axis direction.

Next, when a rotation around the Y-axis is added to the angular velocity sensor 4, Coriolis force acts on the protrusions 41a and 41b of the angular velocity sensor 4, causing bending displacement of the protrusions 41a and 41b.

Then, the bending displacement of the protrusions 41a and 41b is transmitted to the quartz substrate 40, acting as to add stress on the portions on which the detection electrodes 43 and 44 are formed on the quartz substrate 40 and generating an electric charge at these portions. Detecting this electric charge with the detection electrodes 43 and 44 enables detection of angular velocity.

The angular velocity sensor 4 in the second modification can enlarge an area of a detection electrode in addition to an effect of the first embodiment as it includes two detection electrodes. Therefore, compared to an angular velocity sensor including one each of an excitation electrode and a detection electrode, it can increase a detection amount of charge. Accordingly, detection sensitivity of angular velocity can be improved.

Note that it is possible to detect angular velocity when the electrodes 43a and 43b, and the electrodes 44a and 44b are excitation electrodes while the electrode 42a and 42b are detection electrodes. In this case, the excitation electrodes are formed in two sections, increasing displacement of thickness-shear vibration of the quartz substrate. As a result, displacement of thickness-shear vibration excited on the protrusions also increases. According to this, the Coriolis force acting on the protrusions is also increased and bending displacement of the protrusion applies large stress on a portion on which a detection electrode is formed, increasing an amount of charge to detect. Accordingly, detection sensitivity of angular velocity can be improved.

[Third Modification]

Figure 10:
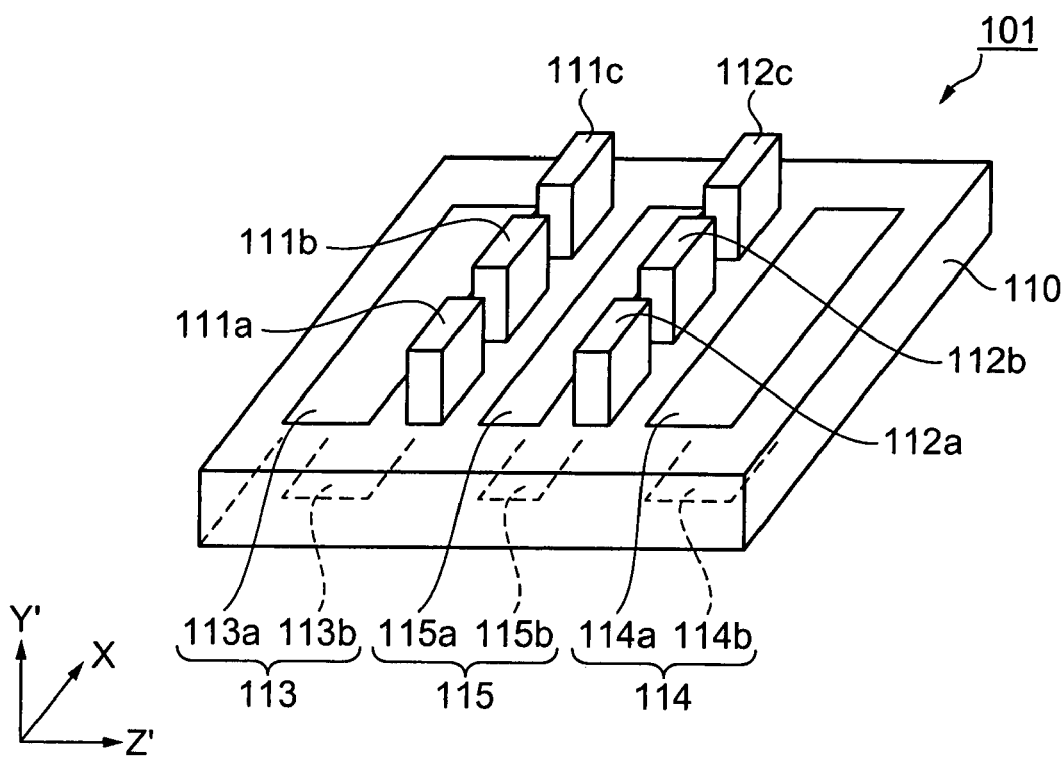
FIG. 10 is a perspective view showing another modification of the angular velocity sensor according to the first embodiment.

FIG. 10 is a perspective view showing another modification of the angular velocity sensor according to the first embodiment. In this modification, a plurality of protrusions are formed in the X-axis direction in addition to the plurality of protrusions formed in the Z'-axis direction.

An angular velocity sensor 101 includes a quartz substrate 110 in a flat plate shape having parallel main surfaces, protrusions 111a, 111b, and 111c, and protrusions 112a, 112b, and 112c monolithically formed with the quartz substrate 110 on one of the main surfaces. These protrusions are formed to be aligned in the X-axis direction by forming two lines in the Z'-axis direction.

Further, main surfaces of the quartz substrate 110 are provided with excitation electrodes 113 and 114, and a detection electrode 115, each being formed as a pair opposed to each other on the main surfaces. The quartz substrate 110 is cut by the AT cut.

The protrusions 111a, 111b, and 111c and the protrusions 112a, 112b, and 112c are formed so as to protrude in the Y'-axis direction and extend in the X-axis direction respectively. In a plain view of the main surface of the quartz substrate 110, the protrusions 111a, 111b, 111c are formed between the excitation electrode 113 and the detection electrode 115, while the protrusions 112a, 112b, and 112c are formed between the excitation electrode 114 and the detection electrode 115.

The excitation electrode 113 is composed of electrodes 113a and 113b formed on the main surfaces so as to be opposed to each other. The detection electrode 114 is composed of electrodes 114a and 114b formed on the main surfaces so as to be opposed to each other. Further, the detection electrode 115 is composed of electrodes 115a and 115b formed on the main surfaces so as to be opposed to each other.

As above, on one of the main surfaces of the quartz substrate 110, the electrode 113a and the electrode 115a are separated by the protrusions 111a, 111b, and 111c. Further, the electrode 114a and the electrode 115a are separated by the protrusions 112a, 112b, and 112c.

Operations of this angular velocity sensor 101 are as described below. When an electric field is applied to the excitation electrode 113 and the excitation electrode 114, thickness-shear vibration in the X-axis direction is generated at these portions on the quartz substrate 110. A portion on which the detection electrode 115 is formed on the quartz substrate 110 is elastically coupled to portions on which the excitation electrodes 113 and 114 are formed, thereby thickness-shear vibration is also generated at this portion of the quartz substrate 110.

Further, the protrusions 111a, 111b, and 111c, and the protrusions 112a, 112b, and 112c are also vibrated as they are pulled by this thickness-shear vibration of the quartz substrate 110.

Next, when a rotation around the Y'-axis is added to the angular velocity sensor 101, Coriolis force acts on the protrusions 111a, 111b, and 111c and the protrusions 112a, 112b, and 112c of the angular velocity sensor 101, causing bending displacement of the protrusions.

Then, the bending displacement of the protrusions 111a, 111b, and 111c and the protrusions 112a, 112b, and 112c is transmitted to the quartz substrate 110, acting as to add stress on the portion on which the detection electrodes 115 is formed on the quartz substrate 110 and generating an electric charge at this portion. Detecting this electric charge with the detection electrode 115 enables detection of angular velocity.

In the angular velocity sensor 101 of the third modification, the excitation electrodes are formed in two sections, increasing displacement of thickness-shear vibration of the quartz substrate 110. As a result, displacement of thickness-shear vibration excited by the protrusions also increases. According to this, the Coriolis force acting on the protrusions is also increased and bending displacement of the protrusions applies large stress on the portion on which the detection electrode 115 is formed, increasing an amount of charge to detect. Accordingly, detection sensitivity of angular velocity can be improved.

Note that it is possible to detect angular velocity when the electrodes 115a and 115b are excitation electrodes while the electrodes 113a and 113b and the electrodes 114a and 114c are detection electrodes. In this case, since the angular velocity sensor includes two detection electrodes, an area of a detection electrode is enlarged and a detection amount of charge is increased compared to an angular velocity sensor including one each of an excitation electrode and a detection electrode.

[Fourth Modification]

Figure 11:
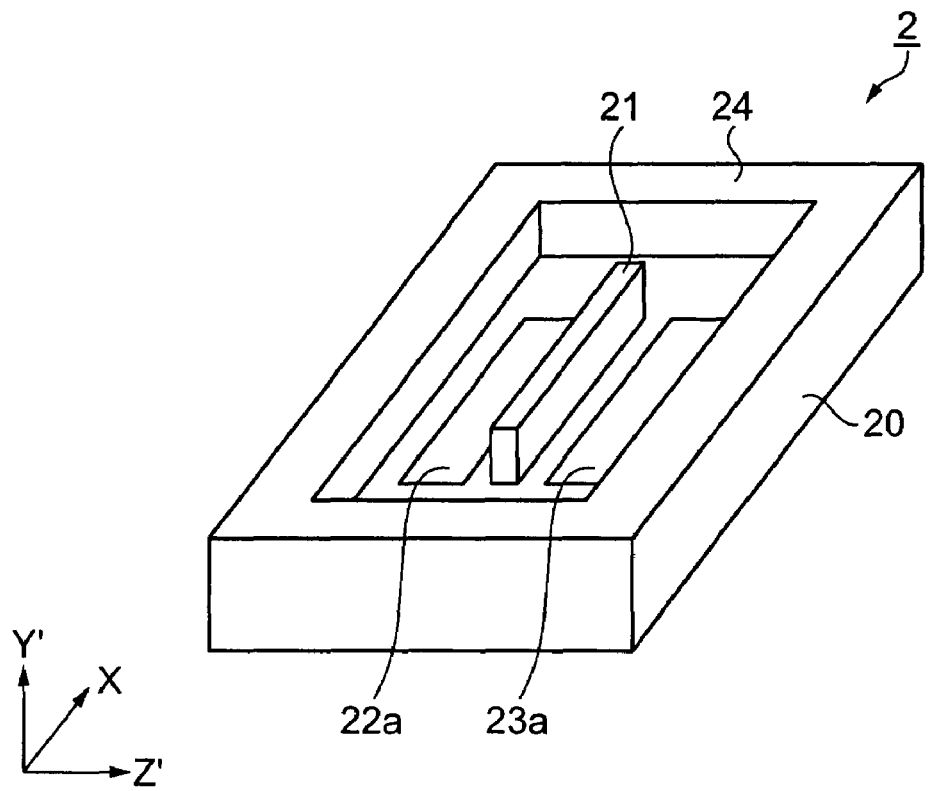
FIG. 11 is a perspective view showing another modification of the angular velocity sensor according to the first embodiment.

FIG. 11 is a perspective view showing another modification of the angular velocity sensor according to the first embodiment. In this modification, a frame portion is formed around the angular velocity sensor of the first embodiment. Further, FIG. 12 is a sectional view showing a packaged state using the angular velocity sensor in FIG. 11.

Figure 12:
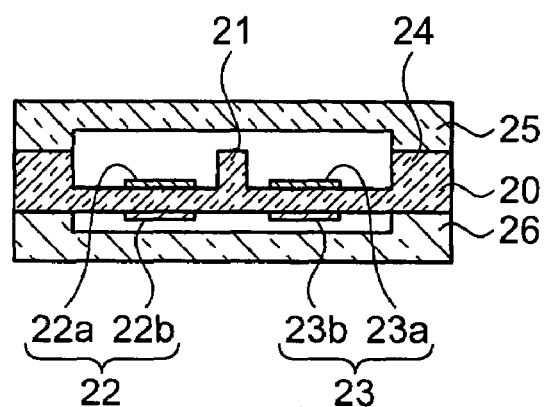
FIG. 12 is a sectional view showing an example of a packaged angular velocity sensor according to the modification.

As shown in FIGS. 11 and 12, an angular velocity sensor 2 includes a recess portion formed in a quartz substrate 20. In the recess portion, a protrusion 21, an excitation electrode 22 composed of electrodes 22a and 22b, and a detection electrode 23 composed of electrodes 23a and 23b are provided. Further, a frame portion 24 is formed around the recess portion.

Then, lids made of glass or quartz crystal are joined at the frame portion 24 of the angular velocity sensor 2 as shown in FIG. 12, providing an angular velocity sensor that is packaged.

Second Embodiment

Next, an angular velocity sensor of a second embodiment will be described.

Figure 13:
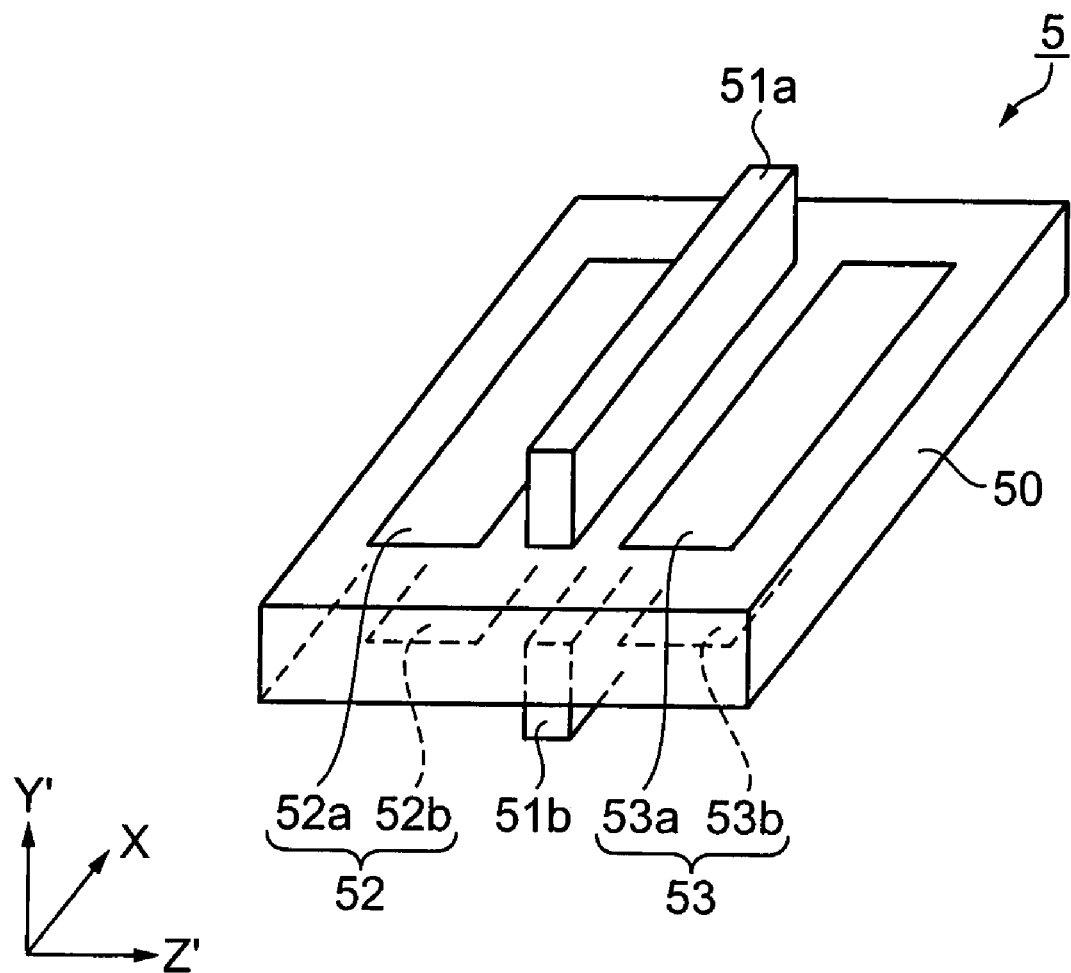
FIG. 13 is a perspective view schematically showing an angular velocity sensor according to the second embodiment.
Figure 14A:
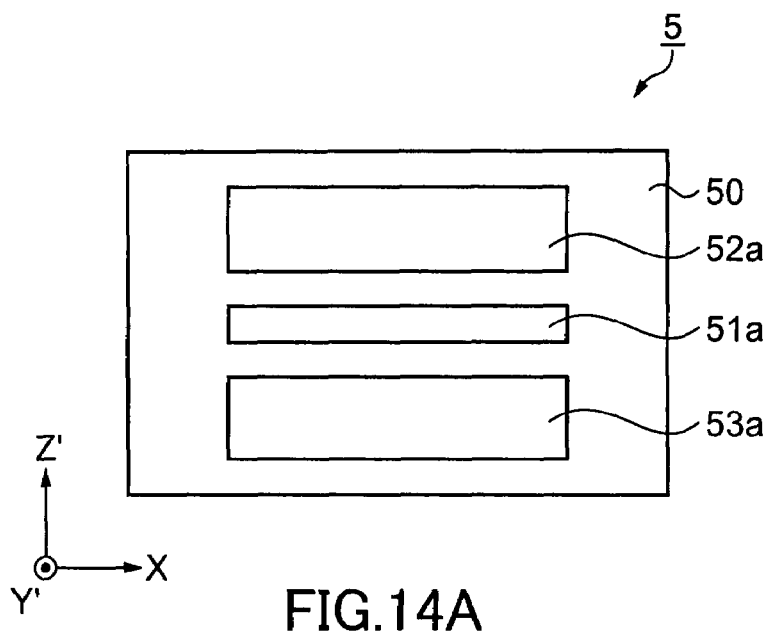

FIG. 13 is a perspective view schematically showing an angular velocity sensor according to this embodiment. FIG. 14 shows a structure of the angular velocity sensor according to this embodiment. FIG. 14(a) is a plain view, while FIG. 14(b) is a side view, and FIG. 14(c) is a bottom view.

In FIG. 13, an angular velocity sensor 5 includes a quartz substrate 50 in a flat plate shape having parallel main surfaces, protrusions 51a and 51b monolithically formed with the quartz substrate 50 on both of the main surfaces, an excitation electrode 52 and a detection electrode 53, each being formed as a pair opposed to each other on the main surfaces of the quartz substrate and on both sides of the protrusions 51a and 51b.

The quartz substrate 50 is formed using a quartz crystal rotated Y plate described in FIG. 3 and cut by the AT cut.

Figure 14B:
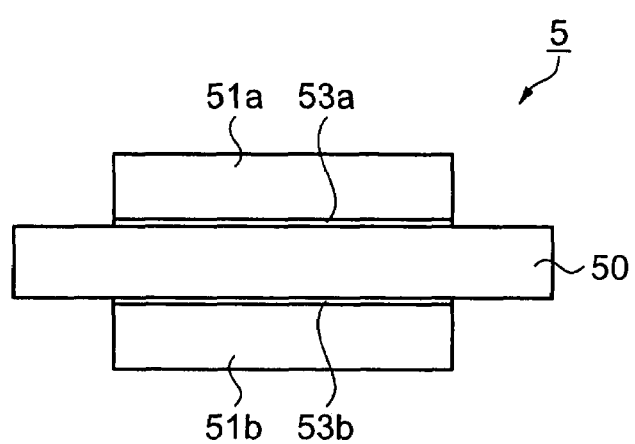
FIG. 14(b) is a side view and FIG. 14(c) is a bottom view.
Figure 14C:
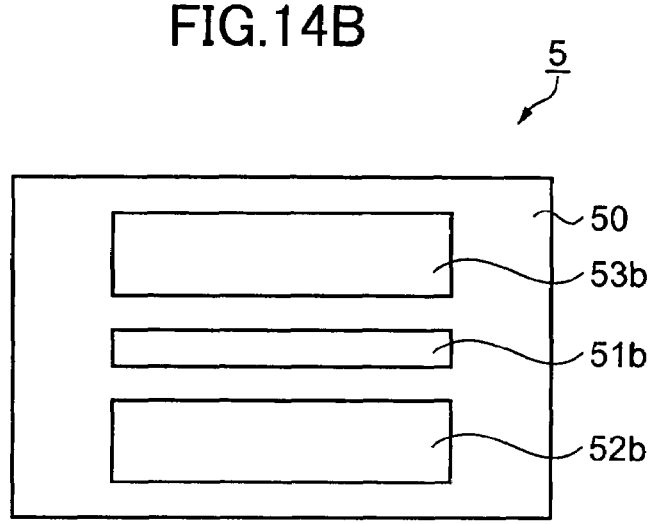

The protrusions 51a and 51b are formed on both of the main surfaces of the quartz substrate 50 so as to be opposed to each other as shown in FIGS. 13 and 14(b). Further, each of these protrusions 51a and 51b is formed so as to protrude in a Y'-axis direction and extend in an X-axis direction. The protrusions 51a and 51b can be monolithically formed with the quartz substrate by etching the quartz substrate.

An electrode 52a composes an excitation electrode 52 with an electrode 52b formed on the other of the opposed main surfaces of the quartz substrate 50. The excitation electrode 52 excites thickness-shear vibration of the quartz substrate 50 by applying an electric field between the electrode 52a and the electrode 52b. Further, an electrode 53a composes a detection electrode 53 with an electrode 53b formed on the other of the opposed main surfaces of the quartz substrate 50. The detection electrode 53 can detect an amount of charge caused by change in a stress condition of the quartz substrate 50.

Further, in a plain view of the main surface of the quartz substrate 50, the protrusion 51a is formed between the electrode 52a and the electrode 53a (refer to FIG. 14(a)). As above, on the one of the main surfaces of the quartz substrate 50, the electrode 52a and the electrode 53a are separated by the protrusion 51a. Similarly, on the other main surface of the quartz substrate 50, the electrode 52b and the electrode 53b are separated by the protrusion 51b (refer to FIG. 14(c)).

The excitation electrode 52 and the detection electrode 53 include a Cr film as an underlayer, and a Au film formed thereon.

Next, operations of excitation and detecting angular velocity of the angular velocity sensor 5 mentioned above will be explained.

Figure 15:
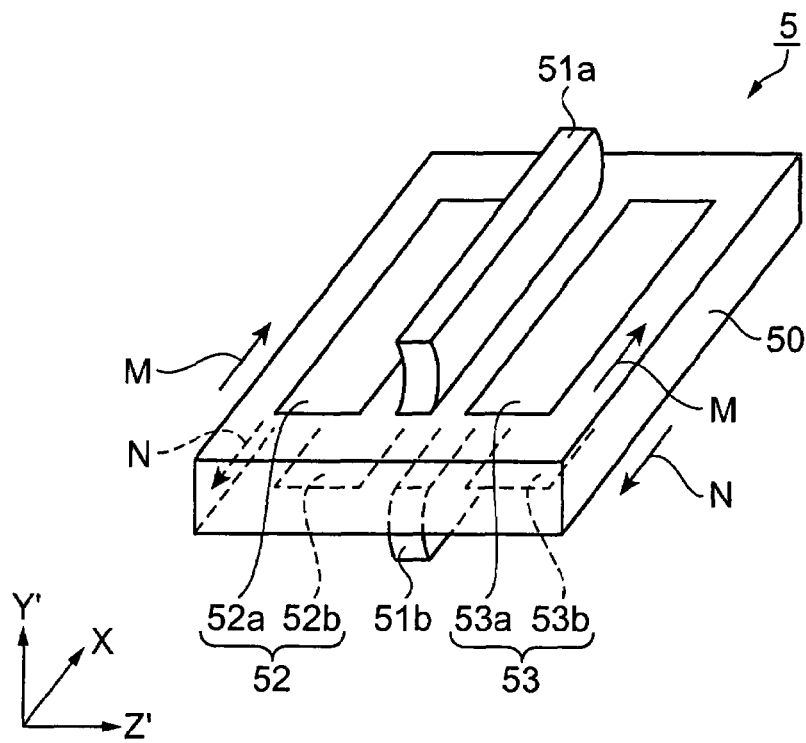
FIG. 15 is a schematic view explaining an excitation mode of the angular velocity sensor according to the second embodiment.
Figure 16:
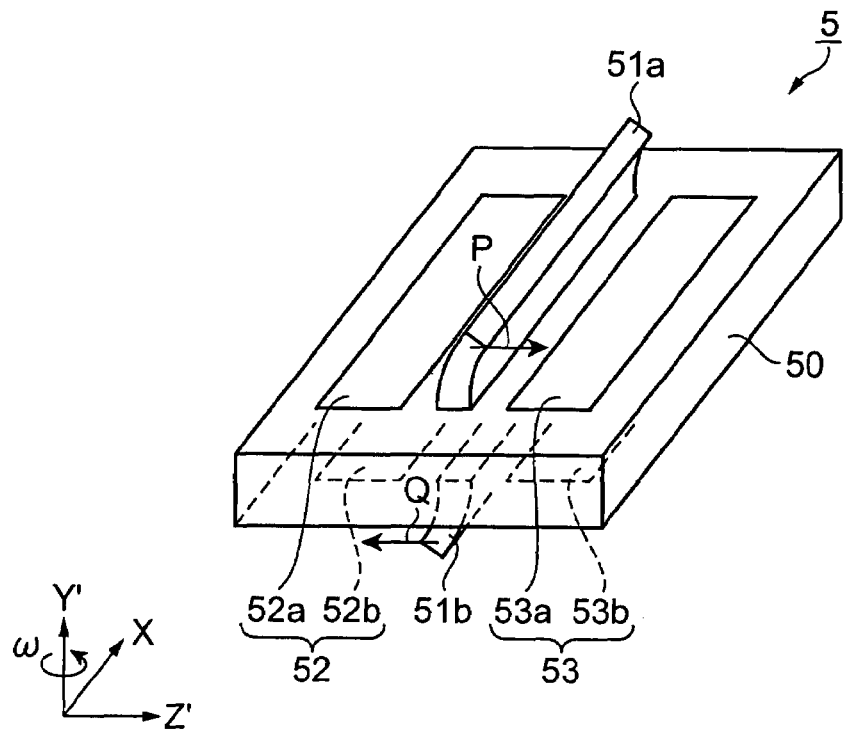
FIG. 16 is a schematic view explaining a detection mode of the angular velocity sensor according to the second embodiment.

FIG. 15 is a schematic view explaining an excitation mode of the angular velocity sensor according to the embodiment. FIG. 16 is a schematic view explaining a detection mode of the angular velocity sensor according to the embodiment.

In FIG. 15, when an electric field is applied to the quartz substrate 50 by the excitation electrode 52, thickness-shear vibration in the X-axis direction is generated at a portion sandwiched by the electrode 52a and the electrode 52b on the quartz substrate 50. The one of the main surfaces of the quartz substrate 50 moves in a direction of an arrow M and the other main surface moves in a direction of an arrow N. These movements and opposite movements thereof are performed alternatively and continuously, thereby generating the thickness-shear vibration. A portion on which the detection electrode 53 is formed on the quartz substrate 50 is elastically coupled to a portion on which the excitation electrode 52 is formed, thereby thickness-shear vibration is also generated at this portion of the quartz substrate 50. Further, the protrusions 51a and 51b are also vibrated as they are pulled by this thickness-shear vibration of the quartz substrate 50. The vibration of the protrusions 51a and 51b is dominated by vibration in the X-axis direction. However, the vibration includes vibration in a Z'-axis direction as it is pulled toward to the excitation electrode 52 where strong thickness-shear vibration is generated.

Next, when a rotation around a Y'-axis is added to the angular velocity sensor 5 in the excitation mode described above, as shown in FIG. 16, Coriolis force acts on the protrusions 51a and 51b of the angular velocity sensor 5, causing bending displacement of the protrusion 51a in a direction of an arrow P, and the protrusion 51b in a direction of an arrow Q. The Coriolis force acts in an orthogonal direction with respect to the vibration of the protrusions 51 in the excitation mode. Therefore, the protrusions 51a and 51b perform flexural vibration alternatively in the direction of the arrow P or the direction of the arrow Q and an opposed direction thereof corresponding to this vibration.

Then, the bending displacement of the protrusions 51a and 51b is transmitted to the quartz substrate 50, acting as to add stress on the portion on which the detection electrodes 53 is formed on the quartz substrate 50 and generating an electric charge at this portion. Detecting this electric charge with the detection electrode 53 enables detection of angular velocity ω.

In such detection of the angular velocity sensor, angular velocity is detectable by using an excitation and detection circuit explained in FIG. 6.

Since protrusions are formed on both of the main surfaces in this embodiment, it is possible to obtain a large amount of charge compared to the case where a protrusion is formed on one of the main surfaces explained in FIG. 7.

As above, the angular velocity sensor 5 according to this embodiment includes the protrusions 51a and 51b protruding in the Y'-axis direction and extending in the X-axis direction on both of the main surfaces of the quartz substrate 50 that is a rotated Y quartz plate. Then, the protrusions 51a and 51b are formed between the excitation electrode 52 and the detection electrode 53 on the main surfaces of the quartz substrate 50.

In this angular velocity sensor 5, by applying an electric field to the excitation electrode 52, thickness-shear vibration is generated at the portion on which this excitation electrode 52 is formed, and also at the portion on which the detection electrode 53 is formed. At this time, vibration is excited at the protrusions 51a and 51b. When the rotation around the Y'-axis is added to the angular velocity sensor in this state, bending displacement of the protrusions 51a and 51b in the direction of the arrow P and the direction of the arrow Q occurs due to Coriolis force. Then, the bending displacement of the protrusions 51a and 51b is transmitted to the quartz substrate 50, acting as to add stress on the portion on which the detection electrode 53 is formed on the quartz substrate 50 and generating an electric charge at this portion. Detecting this electric charge with the detection electrode 53 enables detection of angular velocity.

As above, according to the angular velocity sensor 5 of this embodiment, thickness-shear vibration that is an energy trapping type is used in the excitation mode, facilitating a supporting structure of a resonator. Further, since the protrusions 51a and 51b are formed on both of the main surfaces, bending displacement of the protrusions 51a and 51b is transmitted to the quartz substrate 50 larger compared to a case where a protrusion is formed on one side, generating a large amount of charge. Further, since an AT-cut quartz substrate is used, it has superior frequency-temperature characteristics similar to an AT-cut crystal resonator, stably enabling highly accurate detection of angular velocity in a wide range of temperature.

Next, a modification of the second embodiment will be described.

[Fifth Modification]

Figure 17:
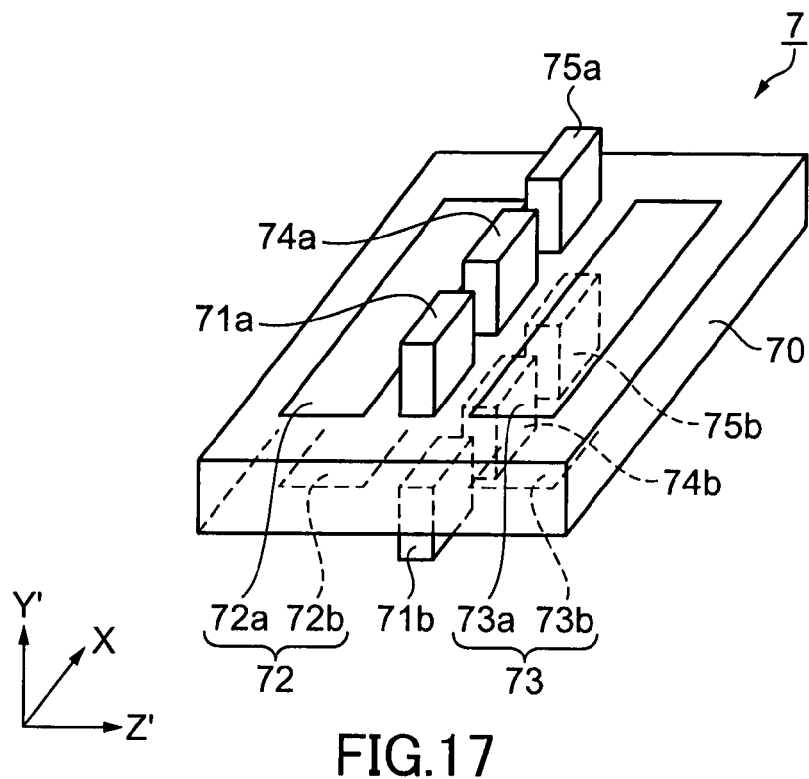
FIG. 17 is a perspective view showing a modification of the angular velocity sensor according to the second embodiment.

FIG. 17 is a perspective view showing a modification of the angular velocity sensor according to the second embodiment. In this modification 5, a point in which a plurality of protrusions are formed is different from the second embodiment.

An angular velocity sensor 7 includes a quartz substrate 70 in a flat plate shape having parallel main surfaces, a plurality of protrusions 71a, 71b, 74a, 74b, 75a, and 75b monolithically formed with the quartz substrate 70 on both of the main surfaces, an excitation electrode 72 and a detection electrode 73, each being formed as a pair opposed to each other on the main surfaces. The quartz substrate 70 is cut by the AT cut. The protrusions 71a, 74a, and 75a are formed between the excitation electrode 72 and the detection electrode 73 in a plain view of the main surface of the quartz substrate 70. The excitation electrode 72 is composed of electrodes 72a and 72b formed on the main surfaces of the quartz substrate so as to be opposed to each other. Similarly, the detection electrode 73 is composed of electrodes 73a and 73b formed on the main surfaces of the quartz substrate so as to be opposed to each other. As above, on the one of the main surfaces of the quartz substrate 70, the electrode 72a and the electrode 73a are separated by the protrusions 71a, 74a, and 75a.

Similarly, the protrusions 71b, 74b, and 75b are formed between the excitation electrode 72 and the detection electrode 73. Then, on the other main surface of the quartz substrate 70, the electrode 72b and the electrode 73b are separated by the protrusions 71b, 74b, and 75b.

As for height, length, and width of each protrusion of the protrusions 71a, 71b, 74a, 74b, 75a, and 75b, all of the sizes can be either same or different. Further, the number of protrusions is not limited to the number shown in the figure. Therefore, more protrusions can be formed.

As for operations of this angular velocity sensor 7, each protrusion functions as the same as the protrusions described in the second embodiment. A rotation is added to the protrusions 71a, 71b, 74a, 74b, 75a, and 75b while vibration is excited, causing bending displacement of the protrusions 71a, 71b, 74a, 74b, 75a, and 75b. The bending displacement is added to the quartz substrate 70 as stress, and then the detection electrode detects an amount of charge generated.

The angular velocity sensor in the fifth modification can increase displacement of protrusions in a case where a rotation is added to the angular velocity sensor 7 by forming a plurality of protrusions in addition to an effect of the second embodiment. As a result, stress added to the quartz substrate 70 increases, increasing an amount of charge generated in the quartz substrate. Accordingly, detection sensitivity of angular velocity that is proportional to an amount of charge can be improved.

[Sixth Modification]

Figure 18:
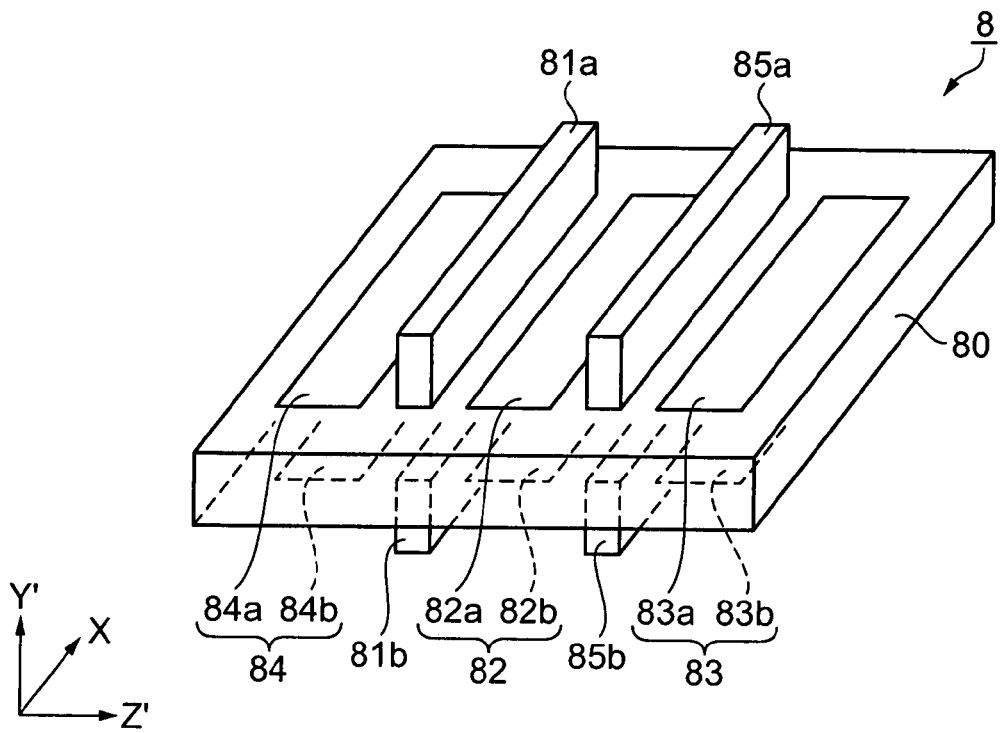
FIG. 18 is a perspective view showing another modification of the angular velocity sensor according to the second embodiment.

FIG. 18 is a perspective view showing another modification of the angular velocity sensor according to the second embodiment. In this modification, a point in which a plurality of protrusions are formed in the Z'-axis direction is different from the second embodiment.

An angular velocity sensor 8 includes a quartz substrate 80 in a flat plate shape having parallel main surfaces, a plurality of protrusions 81a, 81b, 85a, and 85b monolithically formed with the quartz substrate 80 on both of the main surfaces, an excitation electrode 82 and detection electrodes 83 and 84 formed on the main surfaces. The quartz substrate 80 is cut by the AT cut.

The protrusions 81a, 81b, 85a, and 85b are formed on both of the main surfaces of the quartz substrate 80 so as to protrude in the Y'-axis direction and extend in the X-axis direction respectively. The protrusions 81a and 81b, and the protrusions 85a and 85b are respectively formed to be opposed to each other across the quartz substrate 80.

In a plain view of the main surface of the quartz substrate 80, the protrusion 81a is formed between the excitation electrode 82 and the detection electrode 84, while the protrusion 85a is formed between the excitation electrode 82 and the detection electrode 83.

The excitation electrode 82 is composed of electrodes 82a and 82b formed on the main surfaces so as to be opposed to each other.

Further, the detection electrode 83 is composed of electrodes 83a and 83b formed on the main surfaces so as to be opposed to each other, while the detection electrode 84 is composed of electrodes 84a and 84b. As above, on the one of the main surfaces of the quartz substrate 80, the electrode 82a, the electrodes 83a and 84a are separated by the protrusions 81a and 85a.

Similarly, on the other main surface of the quartz substrate 80, the electrode 82b, the electrodes 83b and 84b are separated by the protrusions 81b and 85b.

Operations of this angular velocity sensor 8 are as described below. When an electric field is applied to the excitation electrode 82, thickness-shear vibration in the X-axis direction is generated at this portion on the quartz substrate 80. Portions on which the detection electrode 83 and the detection electrode 84 are formed on the quartz substrate 80 are elastically coupled to the portion on which the excitation electrode 82 is formed, thereby thickness-shear vibration is also generated at these portions of the quartz substrate 80.

Then, the protrusions 81a, 81b, 85a, and 85b are also vibrated as they are pulled by this thickness-shear vibration of the quartz substrate 80. The vibration of these protrusions 81a, 81b, 85a, and 85b is dominated by vibration in the X-axis direction.

Next, when the rotation around the Y-axis is added to the angular velocity sensor 8, Coriolis force acts on the protrusions 81a, 81b, 85a, and 85b of the angular velocity sensor 8, causing bending displacement of the protrusions 81a, 81b, 85a, and 85b.

Then, the bending displacement of the protrusions 81a, 81b, 85a, and 85b is transmitted to the quartz substrate 80, acting as to add stress on the portions on which the detection electrodes 83 and 84 are formed on the quartz substrate 80 and generating an electric charge at these portions. Detecting this electric charge with the detection electrodes 83 and 84 enables detection of angular velocity.

The angular velocity sensor 8 in the sixth modification can enlarge an area of a detection electrode in addition to an effect of the second embodiment as it includes two detection electrodes. Therefore, compared to an angular velocity sensor including one each of an excitation electrode and a detection electrode, it can increase a detection amount of charge. Accordingly, detection sensitivity of angular velocity can be improved.

Note that it is possible to detect angular velocity when the electrodes 83a and 83b, and the electrodes 84a and 84b are excitation electrodes while the electrode 82a and 82b are detection electrodes. In this case, the excitation electrodes are formed in two sections, increasing displacement of thickness-shear vibration of the quartz substrate. As a result, displacement of thickness-shear vibration excited on the protrusions also increases. According to this, the Coriolis force acting on the protrusions is also increased and bending displacement of the protrusion applies large stress on a portion on which a detection electrode is formed, increasing an amount of charge to detect. Accordingly, detection sensitivity of angular velocity can be improved.

[Seventh Modification]

Figure 19:
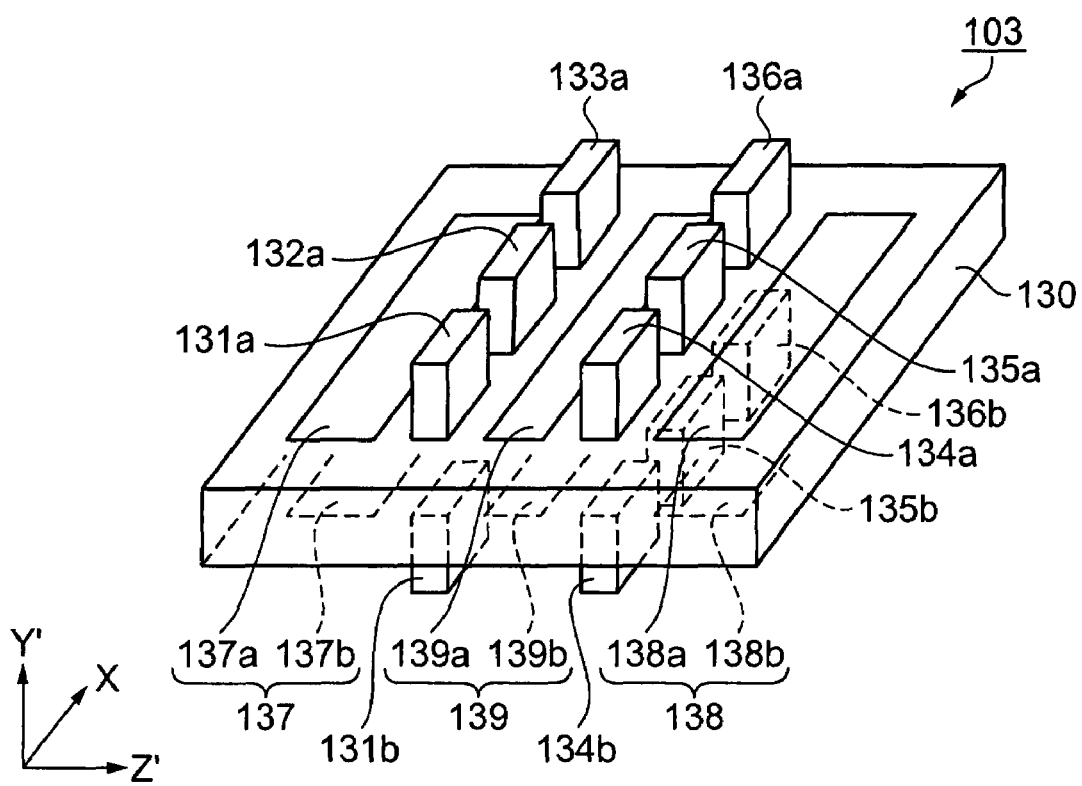
FIG. 19 is a perspective view showing another modification of the angular velocity sensor according to the second embodiment.

FIG. 19 is a perspective view showing another modification of the angular velocity sensor according to the second embodiment. In this modification, a plurality of protrusions are formed in the X-axis direction in addition to the plurality of protrusions formed in the Z'-axis direction.

An angular velocity sensor 103 includes a quartz substrate 130 in a flat plate shape having parallel main surfaces, protrusions monolithically formed with the quartz substrate 130.

On one of main surfaces, protrusions 131a, 132a, and 133a, and protrusions 134a, 135a, and 136a are provided. On the other main surface, protrusions 131b, 132b (not shown), and 133b (not shown), and protrusions 134b, 135b, and 136b are provided. These protrusions are formed to be aligned in the X-axis direction by forming two lines in the Z'-axis direction. In addition, these protrusions are respectively formed to be opposed to each other between the one main surface and the other main surface.

Further, the main surfaces of the quartz substrate 130 are provided with excitation electrodes 137 and 138, and a detection electrode 139, each being formed as a pair opposed to each other on the main surfaces. The quartz substrate 130 is cut by the AT cut.

The protrusions 131a, 132a, and 133a, the protrusions 134a, 135a, and 136a, the protrusions 131b, 132b, and 133b, and the protrusions 134b, 135b, and 136b are respectively formed so as to protrude in the Y'-axis direction and extend in the X-axis direction.

In a plain view of the main surface of the quartz substrate 130, the protrusions 131a, 132a, and 133a are formed between the excitation electrode 137 and the detection electrode 139, and the protrusions 134a, 135a, and 136a are formed between the excitation electrode 138 and the detection electrode 139.

The excitation electrode 137 is composed of electrodes 137a and 137b formed on the main surfaces so as to be opposed to each other while the excitation electrode 138 is composed of electrodes 138a and 138b formed on the main surfaces so as to be opposed to each other. Further, the detection electrode 139 is composed of electrodes 139a and 139b formed on the main surfaces so as to be opposed to each other.

As above, on the one of the main surfaces of the quartz substrate 130, the electrode 137a and the electrode 139a are separated by the protrusions 131a, 132a, and 133a. Further, the electrode 138a and the electrode 139a are separated by the protrusions 134a, 135a, and 136a.

Operations of this angular velocity sensor 103 are as described below. When an electric field is applied to the excitation electrode 137 and the excitation electrode 138, thickness-shear vibration in the X-axis direction is generated at these portions on the quartz substrate 130. A portion on which the detection electrode 139 is formed on the quartz substrate 130 is elastically coupled to the portions on which the excitation electrodes 137 and 138 are formed, thereby thickness-shear vibration is also generated at this portion of the quartz substrate 130.

Further, the protrusions 131a, 132a, and 133a, the protrusions 134a, 135a, and 136a, the protrusions 131b, 132b, and 133b, and the protrusions 134b, 135b, and 136b are vibrated as they are pulled by this thickness-shear vibration of the quartz substrate 130.

Next, when a rotation around the Y'-axis is added to the angular velocity sensor 103, Coriolis force acts on the protrusions 131a, 132a, and 133a, the protrusions 134a, 135a, and 136a, the protrusions 131b, 132b, and 133b, and the protrusions 134b, 135b, and 136b of the angular velocity sensor 103, causing bending displacement of the protrusions.

Then, the bending displacement of the protrusions 131a, 132a, and 133a, the protrusions 134a, 135a, and 136a, the protrusions 131b, 132b, and 133b, and the protrusions 134b, 135b, and 136b is transmitted to the quartz substrate 130, acting as to add stress on the portion on which the detection electrode 139 is formed on the quartz substrate 130 and generating an electric charge at this portion. Detecting this electric charge with the detection electrode 139 enables detection of angular velocity.

In the angular velocity sensor 103 of the seventh modification, the excitation electrodes are formed in two sections, increasing displacement of thickness-shear vibration of the quartz substrate 130. As a result, displacement of thickness-shear vibration excited by the protrusions also increases. According to this, the Coriolis force acting on the protrusions is also increased and bending displacement of the protrusions applies large stress on the portion on which the detection electrode 139 is formed, increasing an amount of charge to detect. Accordingly, detection sensitivity of angular velocity can be improved.

Note that it is possible to detect angular velocity when the electrodes 139a and 139b are excitation electrodes while the electrodes 137a and 137b and the electrodes 138a and 138b are detection electrodes. In this case, since the angular velocity sensor includes two detection electrodes, an area of a detection electrode is enlarged and a detection amount of charge is increased compared to an angular velocity sensor including one each of an excitation electrode and a detection electrode.

Further, the angular velocity sensor shown in the second embodiment can be packaged in a structure below.

Figure 20:
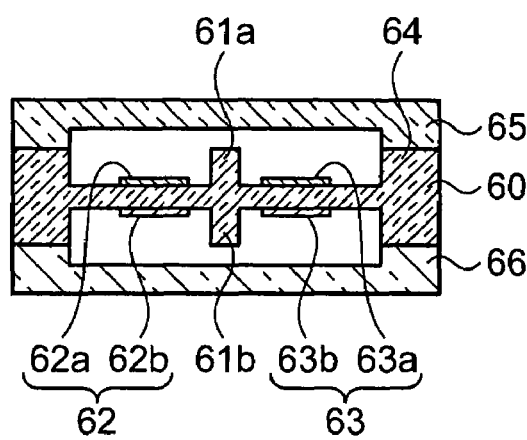
FIG. 20 is a sectional view showing an example of a packaged angular velocity sensor according to the second embodiment.

FIG. 20 is a sectional view showing a state in which an angular velocity sensor is packaged. The angular velocity sensor includes a recess portion formed in a quartz substrate 60. In the recess portion, protrusions 61a and 61b, an excitation electrode 62 composed of electrodes 62a and 62b, and a detection electrode 63 composed of electrodes 63a and 63b are provided. Further, a frame portion 64 is formed around the recess portion. Then, lids 65 and 66 made of glass or quartz crystal are joined at the frame portion 64 of the angular velocity sensor, providing an angular velocity sensor that is packaged.

Note that a position on which an excitation electrode is arranged in this invention can be a position to excite thickness-shear vibration at a portion on which a detection electrode is formed and protrusions. Therefore, the position is not limited to positions in this embodiment.

Further, a position on which a detection electrode is arranged in this invention can be a position to which thickness-shear vibration of the excitation electrode is elastically coupled, and stress is changed because bending displacement of a protrusion is transmitted. Therefore, the position is not limited to those in this embodiment.

What is claimed is:

1. An angular velocity sensor, comprising:
   a quartz substrate in a flat plate shape being cut out from quartz single crystal rotated by a range of zero to one hundred eighty degrees around an X-axis from a crystal coordinate system (X, Y, Z) to a coordinate system (X, Y', Z') so that a main surface is parallel with respect to the X-axis and a Z'-axis of the coordinate system (X, Y', Z');
   a protrusion monolithically formed with the quartz substrate on the main surface so as to protrude in a Y'-axis direction and extend in an X-axis direction;
   an excitation electrode and a detection electrode formed adjacent to the protrusion on the main surface, wherein vibration is excited at the protrusion by exciting thickness-shear vibration in the X-axis direction on a portion having the excitation electrode and the detection electrode formed on the quartz substrate by an electric field applied to the excitation electrode, and the protrusion is bent by Coriolis force acting corresponding to a rotation around a Y'-axis, and displacement thereof is transmitted to the quartz substrate, so that the detection electrode detects change of stress applied to the quartz substrate.

2. The angular velocity sensor according to claim 1, wherein the quartz substrate is an AT cut quartz substrate.

3. The angular velocity sensor according to claim 2, wherein the protrusion is formed between the excitation electrode and the detection electrode in a plain view of the main surface.

4. The angular velocity sensor according to claim 3, wherein the protrusion is formed in a plurality of numbers in the X-axis direction.

5. The angular velocity sensor according to claim 4, wherein each of the plurality of protrusions is different in size.

6. The angular velocity sensor according to claim 3, wherein the protrusion is formed in a plurality of numbers in a Z'-axis direction.

7. An angular velocity sensor, comprising:
a quartz substrate in a flat plate shape being cut out from quartz single crystal rotated by a range of zero to one hundred eighty degrees around an X-axis from a crystal coordinate system (X, Y, Z) to a coordinate system (X, Y', Z'), so that main surfaces are parallel with respect to the X-axis and a Z'-axis of the coordinate system (X, Y', Z');
protrusions monolithically formed with the quartz substrate on both of the main surfaces so as to protrude in a Y'-axis direction and extend in an X-axis direction;
an excitation electrode and a detection electrode formed adjacent to the protrusions on the main surfaces, wherein vibration is excited at the protrusions by exciting thickness-shear vibration in the X-axis direction on a portion having the excitation electrode and the detection electrode formed on the quartz substrate by an electric field applied to the excitation electrode, and the protrusions are bent by Coriolis force acting corresponding to a rotation around a Y'-axis and displacement thereof is transmitted to the quartz substrate, so that the detection electrode detects change of stress applied to the quartz substrate.

8. The angular velocity sensor according to claim 7, wherein the quartz substrate is an AT cut quartz substrate.

9. The angular velocity sensor according to claim 8, wherein the protrusions are formed between the excitation electrode and the detection electrode in a plain view of the main surfaces.

10. The angular velocity sensor according to claim 9, wherein the protrusions are formed in a plurality of numbers in the X-axis direction.

11. The angular velocity sensor according to claim 10, wherein each of the plurality of protrusions is different in size.

12. The angular velocity sensor according to claim 9, wherein the protrusions are formed in a plurality of numbers in a Z'-axis direction.

* * * * *